(12) United States Patent
Zhong et al.

(10) Patent No.: US 6,615,615 B2
(45) Date of Patent: Sep. 9, 2003

(54) GEPSG CORE FOR A PLANAR LIGHTWAVE CIRCUIT

(75) Inventors: Fan Zhong, Fremont, CA (US); Jonathan G. Bornstein, Cupertino, CA (US)

(73) Assignee: Lightwave Microsystems Corporation, San Jose, CA (US)

( * ) Notice: Subject to any disclaimer, the term of this patent is extended or adjusted under 35 U.S.C. 154(b) by 0 days.

(21) Appl. No.: 09/895,583

(22) Filed: Jun. 29, 2001

(65) Prior Publication Data

US 2003/0002836 A1 Jan. 2, 2003

(51) Int. Cl.$^7$ .......................... G02B 6/10; C03B 37/018
(52) U.S. Cl. ......................... 65/413; 385/132; 65/386
(58) Field of Search ............................. 385/129, 130, 385/131, 132; 65/413, 414, 415, 416, 417, 418, 419, 420, 421, 422, 423

(56) References Cited

U.S. PATENT DOCUMENTS

| | | | |
|---|---|---|---|
| 4,217,375 A | 8/1980 | Adams | 427/85 |
| 4,339,173 A * | 7/1982 | Aggarwal et al. | 350/96.3 |
| 4,339,174 A * | 7/1982 | Levin | 350/96.3 |
| 4,698,104 A | 10/1987 | Barker | 437/141 |
| 4,783,135 A | 11/1988 | Utsumi | 350/96.3 |
| 4,885,614 A | 12/1989 | Furukawa | 357/16 |
| 4,939,103 A | 7/1990 | Szolgyemy | 437/151 |
| 4,957,773 A | 9/1990 | Spencer | 427/39 |
| 5,037,514 A | 8/1991 | Yamazaki | 204/157.45 |
| 5,316,958 A | 5/1994 | Meyerson | 437/31 |
| 5,336,903 A | 8/1994 | Ozturk | 257/19 |
| 5,340,621 A | 8/1994 | Matsumoto | 427/571 |
| 5,408,569 A | 4/1995 | Nishimoto | 385/132 |
| 5,489,550 A | 2/1996 | Moslehi | 437/165 |
| 5,591,486 A | 1/1997 | Okano | 427/255.2 |
| 5,633,962 A | 5/1997 | Kurata | 385/24 |
| 5,783,257 A | 7/1998 | Shishiguchi | 427/255.2 |
| 5,902,650 A | 5/1999 | Feng | 427/578 |
| 6,002,823 A | 12/1999 | Chandross | 385/50 |
| 6,057,250 A | 5/2000 | Kirchhoff | 438/784 |
| 6,192,712 B1 | 2/2001 | Saito et al. | 65/386 |
| 6,356,694 B1 * | 3/2002 | Weber | 385/132 |
| 6,396,988 B1 * | 5/2002 | Shimoda | 385/129 |

* cited by examiner

Primary Examiner—John D. Lee
Assistant Examiner—Jennifer Doan
(74) Attorney, Agent, or Firm—Wagner, Murabito & Hao LLP (57) ABSTRACT

A method of depositing a core layer for an optical waveguide structure of a planar lightwave circuit. A GePSG core for an optical waveguide structure of a planar lightwave circuit is fabricated such that the optical core comprises doped silica glass, wherein the dopant includes Ge and P. In depositing a core layer from which the optical core is formed, two separate doping gasses (e.g., $GeH_4$ and $PH_3$) are added during the PECVD process to make Ge and P doped silica glass (GePSG). The ratio of the Ge dopant and the P dopant is configured to maintain a constant refractive index within the core layer across an anneal temperature range and to reduce a formation of bubbles within the core layer. The ratio of the Ge dopant and the P dopant is also configured to reduce refractive index birefringence within the core layer across an anneal temperature range.

17 Claims, 7 Drawing Sheets

GEPSG CORE FOR A PLANAR LIGHTWAVE CIRCUIT

FIELD OF THE INVENTION

The present invention relates generally to planar lightwave circuits. More particularly, the present invention relates to a method for growing an optical waveguide core material by plasma enhanced chemical vapor deposition (PECVD) with better refractive index control.

BACKGROUND OF THE INVENTION

Planar lightwave circuits comprise fundamental building blocks for the modern fiber optic communications infrastructure. Planar lightwave circuits are generally devices configured to transmit light in a manner analogous to the transmission of electrical currents in printed circuit boards and integrated circuit devices. Examples include arrayed waveguide grating devices, integrated wavelength multiplexers/demultiplexers, optical switches, optical modulators, wavelength-independent optical couplers, and the like.

Planar lightwave circuits generally involve the provisioning of a series of embedded optical waveguides upon a semiconductor substrate (e.g., silicon), with the optical waveguides fabricated from one or more silica layers, formed on an underlying semiconductor substrate. Fabrication techniques required for manufacturing planar lightwave circuits using silica are generally well known.

Core refractive index control is very critical to the planar lightwave circuit devices. For example, the center wavelength of each channel in an Arrayed Waveguide Grating (AWG) device is directly affected by the refractive index of the core. A deviation of refractive index within 0.0001 will cause the channel center wavelength to vary in the region of 0.1 nm. For a 40 channel AWG operating in the C band (1520 nm~1565 nm), the channel to channel spacing is only 0.8 nm. Therefore, the core refractive index has to be accurate to about 0.0003 across the substrate to provide a high quality AWG device.

Figure 1:
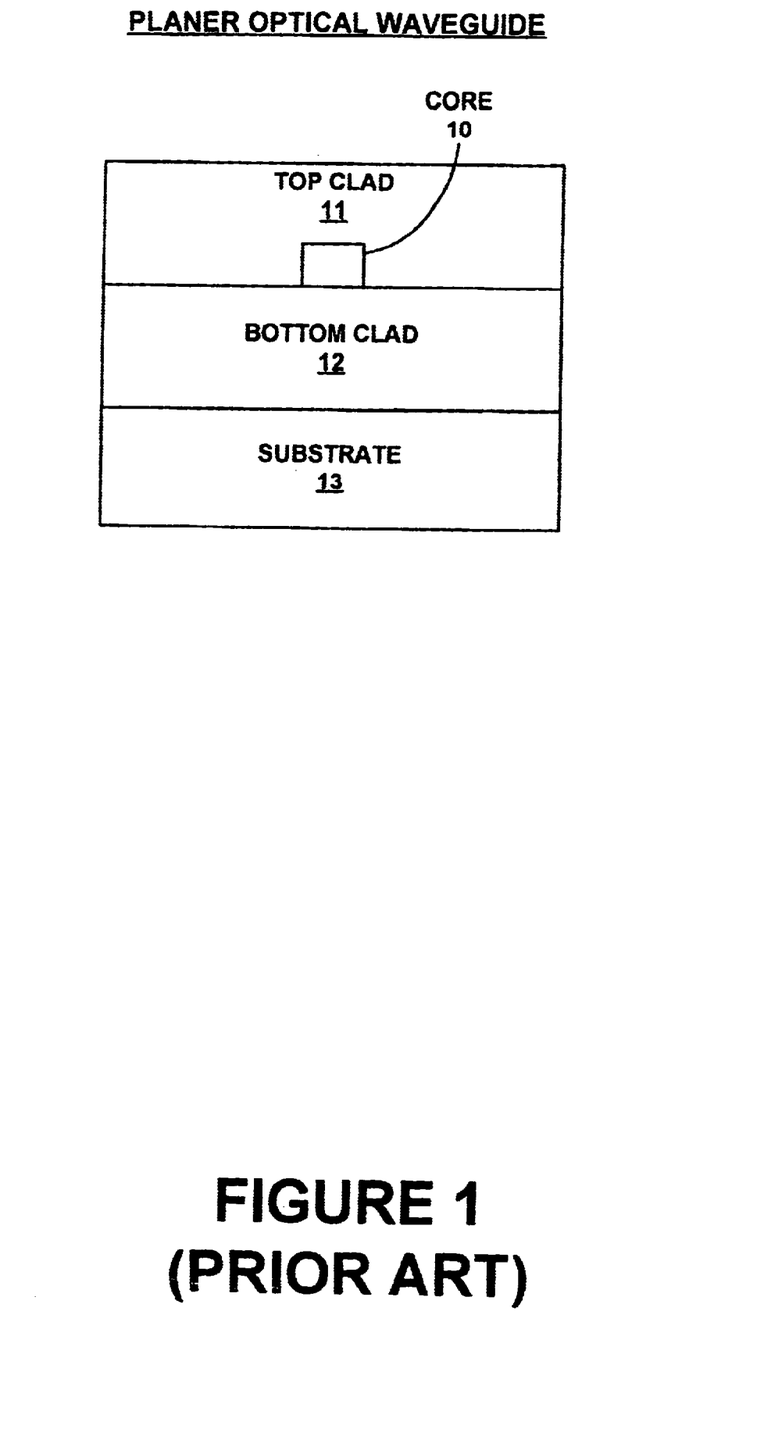
FIG. 1 shows a cross-section view of a conventional planar optical waveguide fabricated using a silica glass substrate.

Prior art FIG. 1 shows a cross-section view of a conventional planar optical waveguide. As depicted in FIG. 1, the planar optical waveguide includes a doped $SiO_2$ glass core 10 formed over a $SiO_2$ bottom cladding layer 12 which is on a silicon substrate 13. A $SiO_2$ top cladding layer 11 covers both the core 10 and the bottom cladding layer 12. As described above, the refractive index of the core 10 is higher than that of the cladding layers 11 and 12. Consequently, optical signals are confined axially within core 10 and propagate lengthwise through core 10. The $SiO_2$ glass core 10 is typically doped with Ge or P to increase its refractive index.

One prior art method for fabricating the core 10 of the planar optical waveguide of FIG. 1 uses a phosphorus doped silica glass layer (PSG) over the $SiO_2$ glass bottom cladding 12. $P_2O_5$ is formed in a silica matrix during PECVD deposition, which raises the refractive index. As described above, the PSG layer is subsequently fabricated (e.g., with lithography and etch processes) into the waveguide core 10.

There are three major problems with using PSG as a waveguide core material. The first problem is that the phosphorus dopant has a tendency to accumulate and form bubbles within the PSG core layer during annealing. The bubbles comprise material defects that greatly reduce the yield of the fabrication process. One method of controlling bubble formation involves the use of multi-step deposition-anneal cycles. Although bubble formation is reduced, it is not completely eliminated. Additionally, the use of multi-step deposition-anneal cycles adds time and expense to the overall planar lightwave circuit fabrication process.

The second problem is that the $P_2O_5$ in the PSG core is much more easily etched in comparison to $SiO_2$. This causes an uncontrollable lateral etch on the side wall of the PSG core and will significantly vary the width of waveguide, which greatly affects the device performance.

The third problem is that the refractive index of PSG decreases with increasing annealing temperature and annealing time, which is caused by phosphorus thermal migration out of the core (dopant loss). Thus, any slight annealing temperature variation will change the core refractive index. As a consequence, the center wavelength will shift in an AWG.

Another prior art method for fabricating the core 10 of the planar optical waveguide of FIG. 1 is to use Germanium as the dopant for the core layer. $GeO_2$ is formed in silica matrix during deposition, which raises the refractive index. However, this germanosilicate glass (GeSG) core layer also experiences problems. One is its large birefingence; almost three times larger than that of PSG. Another problem is that the refractive index of GeSG increases rapidly with increasing anneal temperature.

Figure 2:
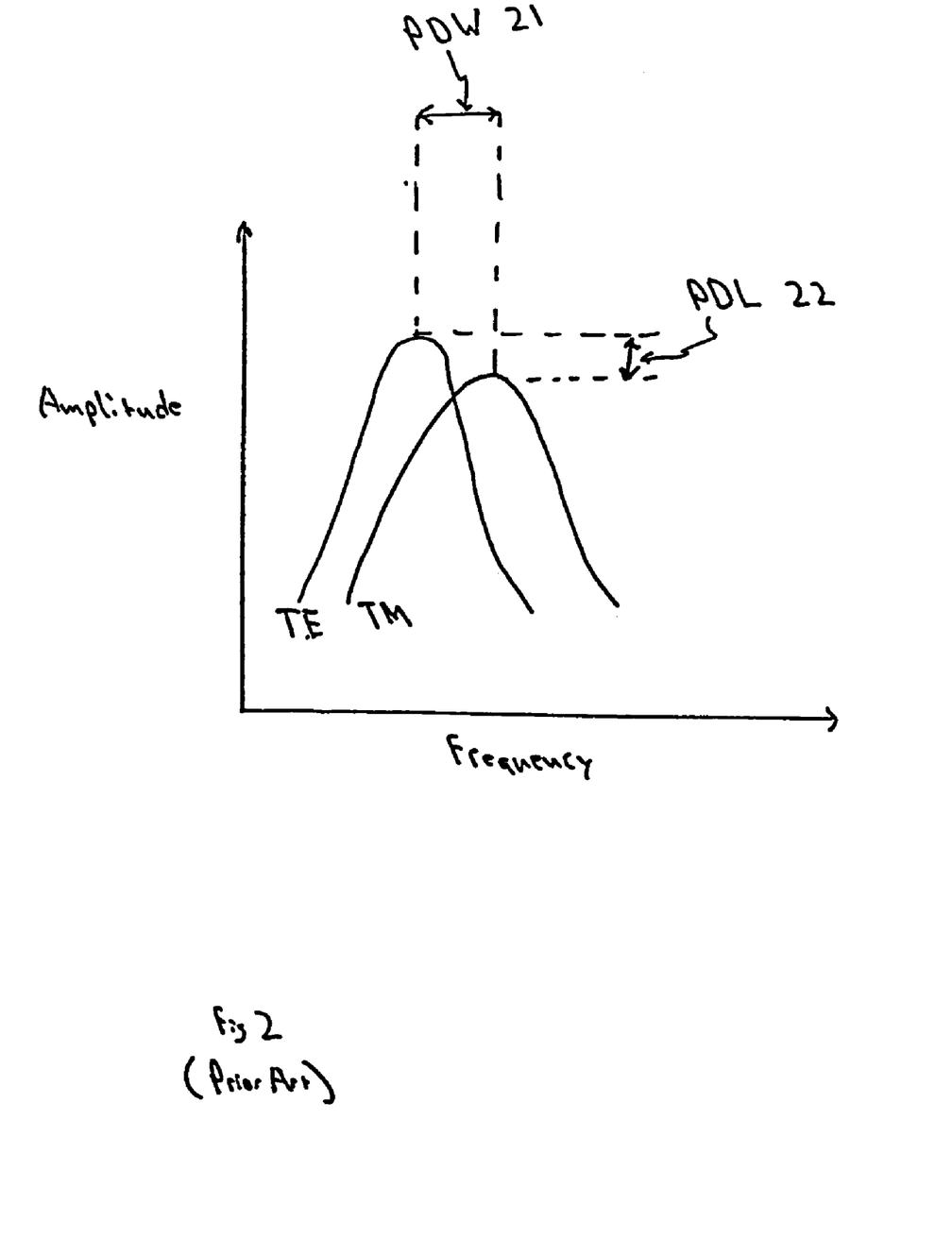
FIG. 2 shows a graph depicting polarization dependent wavelength shift and polarization dependent loss for TE and TM propagation modes within a conventional optical planar waveguide.

Prior art FIG. 2 shows a graph depicting polarization dependent wavelength shift and polarization dependent loss for TE and TM propagation modes, as caused by large birefringence. As depicted in FIG. 2, a TE signal component and a TM signal component are graphed after having experienced polarization dependent wavelength shift (PDW) and polarization dependent loss (PDL), from, for example, propagation along the core 10 of the planar optical waveguide of FIG. 1. The vertical axis of the graph shows amplitude and the horizontal axis shows frequency. As described above, the difference in propagation constants for the TE and TM signal components results in a PDW wavelength shift 21 in the spectral response peak between the TE and TM signal components. This wavelength shift in turn causes a PDL loss 22.

Thus what is required is a solution that provides a predictable and stable refractive index for optical waveguide cores within a planar lightwave circuit. What is required is a solution that renders the refractive index of an optical waveguide core less sensitive to variation in the annealing procedure. What is further required is a solution that eliminates the formation of bubbles and other types of flaws within a core layer. What is required is a solution that reduces birefringence of an optical waveguide core to further reduce polarization dependence of PLC device performance. The present invention provides a novel solution to the above requirements.

SUMMARY OF THE INVENTION

The present invention is a method of depositing a germanophosphosilicate glass (GePSG) core layer for an optical waveguide structure of a planar lightwave circuit. The present invention eliminates the formation of bubbles and reduces other types of flaws within a core layer. The present invention provides a waveguide core with a predictable and stable refractive index, which is independent of variations in the anneal procedure.

In one embodiment, the present invention is implemented as a method of controlling the flow rates of two doping gases, a Ge dopant gas (e.g., $GeH_4$) and a P dopant gas (e.g., $PH_3$) during core layer deposition for an optical waveguide structure of a planar lightwave circuit, to make a germanophosphosilicate glass (GePSG) core layer. The GePSG core for an optical waveguide structure of a planar lightwave circuit is fabricated by PECVD such that the optical core comprises two doping phases, $GeO_2$ and $P_2O_5$, within a $SiO_2$ matrix. The flow rate of the Ge dopant and the flow rate of the P dopant are controlled to form the GePSG core layer having precisely determined ratios of $GeO_2$ and $P_2O_5$. A minimum birefringence can be obtained at a specific ratio of $GeO_2$ and $P_2O_5$.

Controlling of the flow rate for the Ge dopant and the flow rate for the P dopant is configured to reduce the formation of bubbles within the core layer. The flow rates for the Ge dopant and P dopant is configured to reduce birefringence within the core layer across an annealing temperature range for the core layer deposition and annealing process. A thermal anneal process for the core layer can be within a temperature in a range of 900 C. to 1200 C. The reduced amount of $P_2O_5$ (in comparison to a PSG-only doped core layer) enhances the profile control of the core during core layer etch. The GePSG core for an optical waveguide structure significantly reduces the refractive index sensitivity to anneal temperature.

BRIEF DESCRIPTION OF THE DRAWINGS

The present invention is illustrated by way of example and not by way of limitation, in the Figures of the accompanying drawings and in which like reference numerals refer to similar elements and in which.

Prior art

Prior art

DETAILED DESCRIPTION OF THE INVENTION

Reference will now be made in detail to the embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to obscure aspects of the present invention unnecessarily.

Embodiments of the present invention are directed towards a method of depositing a GePSG core layer for an optical waveguide structure of a planar lightwave circuit. The present invention provides a predictable and stable refractive index for optical waveguide cores within a planar lightwave circuit. A GePSG core for an optical waveguide structure in accordance with the present invention provides a solution for refractive index accuracy to 0.0003 within a wafer. The present invention eliminates the formation of bubbles and reduces other types of flaws within a core layer. The present invention and its benefits are further described below.

Figure 3:
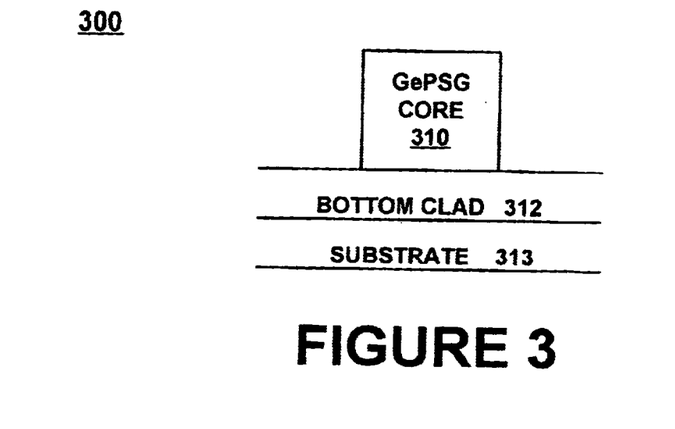
FIG. 3 shows a cross-section view of an optical waveguide structure fabricated in accordance with a GePSG core layer deposition process of the present invention.

FIG. 3 shows a cross-section view of an optical waveguide structure 300 in accordance with one embodiment of the present invention. As depicted in FIG. 3, optical waveguide structure 300 is shown in a state subsequent to etching to remove a core layer used to form core 310. The core 310 is formed over a bottom clad layer 312. Core 310 is a GePSG core in accordance with the present invention.

It should be appreciated that the major steps of silicon oxide deposition, photolithography, and fabrication are well known and widely used in planar lightwave circuit fabrication. Accordingly, such steps will not be described in extensive detail.

Referring still FIG. 3, an optical core layer is formed on a substrate, in this case, bottom clad 312, wherein the optical waveguide core layer has a higher refractive index than bottom clad 312. Bottom clad layer 312 can be a silicon dioxide layer formed over a silicon substrate (not shown).

Core 310 is formed from an optical waveguide core layer of GePSG. As is well known in the art, a layer of doped SiO2 glass is deposited over a bottom clad layer, and this doped SiO2 glass layer is used to form the one or more optical wave guide cores (e.g., core 310) for a planar lightwave circuit. In one embodiment, the present invention is implemented as a method of adding two different doping gases and controlling the doping gas ratio (the ratio of flow rate of Ge dopant gas to that of P dopant gas) during the core layer deposition. Thus, a GePSG core layer for an optical waveguide structure of a planar lightwave circuit is fabricated such that the core layer comprises GePSG doped silica glass. The Ge dopant gas can comprise $GeH_4$, $Ge_2H_6$ or $Ge(C_2H_5O)_4$. The P dopant gas can comprise $PH_3$ or tetramethyl phosphine (TMP).

Once the core layer is deposited, a mask (not shown) is then formed over the core layer using well-known photolithography techniques. The unmasked areas of the optical waveguide core layer are then etched to define the GePSG core 310. The mask is subsequently removed from the core 310, such that the optical waveguide structure 300 appears as shown in FIG. 3.

In depositing the GePSG core layer from which the GePSG core 310 is formed, both doping gases, the Ge dopant gas and P dopant gas, are introduced to the PECVD chamber with $SiH_4$ and $N_2O$. The flow rate of the Ge dopant gas and the flow rate for the P dopant gas are controlled to form the GePSG core layer having precisely determined ratios of $GeO_2$ and $P_2O_5$. These precise ratios function to reduce birefringence problems within the core layer and provide additional benefits.

Refractive index birefringence is generally caused by the stress within the core layer. The predominant cause of this stress is the different coefficients of thermal expansion for the Si substrate 313 and the core layer (e.g., core 310). As is well known, the resulting stress causes mismatches between TE and TM propagation components. However, a GePSG core layer in accordance with one embodiment of the present invention more closely matches the coefficients of thermal expansion (e.g., between core 310 and Si substrate 313, effecting a reduction in birefringence in comparison to the prior art.

Controlling of the flow rate for the Ge dopant gas (e.g., $GeH_4$) and the flow rate for the P dopant gas (e.g., $PH_3$) is also configured to reduce the formation of bubbles within the core layer. For example, with a prior art core layer being doped with PSG only, an anneal process used to stabilize the core layer tends to cause an amount of $P_2O_5$ to undergo a phase separation from the $SiO_2$ matrix, causing the formation of bubbles within the core layer, having extremely adverse affects on the performance of any resulting waveguide. In contrast, a GePSG doped core layer in accordance with the present invention has a much smaller concentration of $P_2O_5$ and thus, a much smaller chance of induced bubble formation during anneal. Reducing the likelihood of bubble formation increases the performance of resulting waveguides and thus increases the yield of the device fabrication process.

The flow rates for the germanium and phosphorus dopants are configured to reduce birefringence within the core layer across an anneal temperature range. As described above, during an anneal process, high temperatures are used to stabilize the refractive index of the core layer and to expel any impurities introduced during the PECVD process (e.g., H and N bonded radicals). $P_2O_5$ and $GeO_2$ function by increasing the refractive index of the core layer with respect to the bottom clad (e.g., bottom clad 312). The high temperatures of the anneal process tends to reduce refractive index within the core layer from the addition of a given amount of $P_2O_5$. On the other hand, the high temperatures of the anneal process tends to increase the refractive index obtained within the core layer from the addition of a given amount of $GeO_2$. Hence, in accordance with the present invention, by selecting a certain ratio of P dopant gas and Ge dopant gas, a stable refractive index of GePSG core can be created within the anneal temperature from 950 C. to 1100 C. in comparison to the prior art.

The flow rates for the Ge dopant gas and P dopant gas are also configured to reduce isotropic etch problems due to an overly rich P dopant in the core layer. As is well known, a rich $P_2O_5$ phase causes a high etch rate for the PSG-only doped core layer. This causes a problem in attempting to precisely define the profile of the waveguide core during core layer etch process. A precisely "rectangular" waveguide core is desired, in part, to control the TE and TM propagation modes. The high etch rate characteristic of a PSG-only doped core layer causes "sidewall erosion" of the optical waveguide core, wherein instead of being vertical with respect to a flat upper surface and a flat lower surface, the sidewalls of the waveguide core are tapered with an angle less than 90 degrees. In contrast, a GePSG doped core layer has much less $P_2O_5$ which makes the width and profile of waveguide core more readily controllable.

In the following FIGS. 4–7, a series of graphs are shown depicting the characteristics of a GePSG core layer under different conditions and having different ratios.

Figure 4:
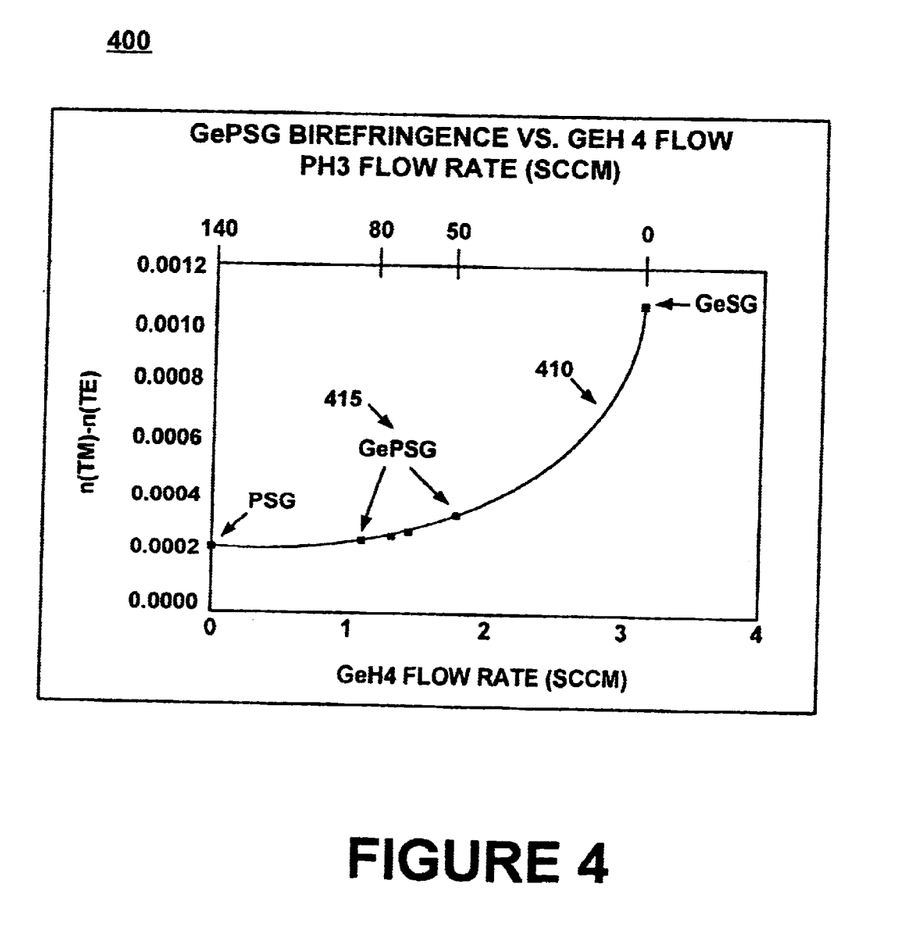
FIG. 4 shows a graph of experimental test results depicting birefringence of a GePSG core with respect to the flow rates of a phosphorus dopant and a germanium dopant in accordance with one embodiment of the present invention.

FIG. 4 shows a graph 400 of experimental test results depicting birefringence of a GePSG core (e.g., GePSG core 310 of FIG. 3) with respect to the flow rates of a P dopant gas (e.g., $PH_3$) and a Ge dopant gas (e.g., $GeH_4$). The upper horizontal axis of FIG. 4 shows the flow rate of $PH_3$, ranging from 0 to 140 (sccm). The lower horizontal axis of FIG. 4 shows the flow rate of the $GeH_4$, ranging from 0 to 4 (sccm). The vertical axis of FIG. 4 shows birefringence, defined here as the expression n(TM)−n(TE).

As shown in FIG. 4, on the right hand side of trace 410, the refractive index of pure germanium doped silica glass (GeSG) has a large birefringence. The refractive index of pure phosphorus doped silica glass (PSG), shown on the left-hand side of trace 410, has a relatively low birefringence. However, a birefringence minimum is obtained with a ratio of $GeH_4$ to $PH_3$, as shown by arrows 415, thus showing the benefits of using GePSG for reducing polarization sensitivity of the PLC device.

Figure 5:
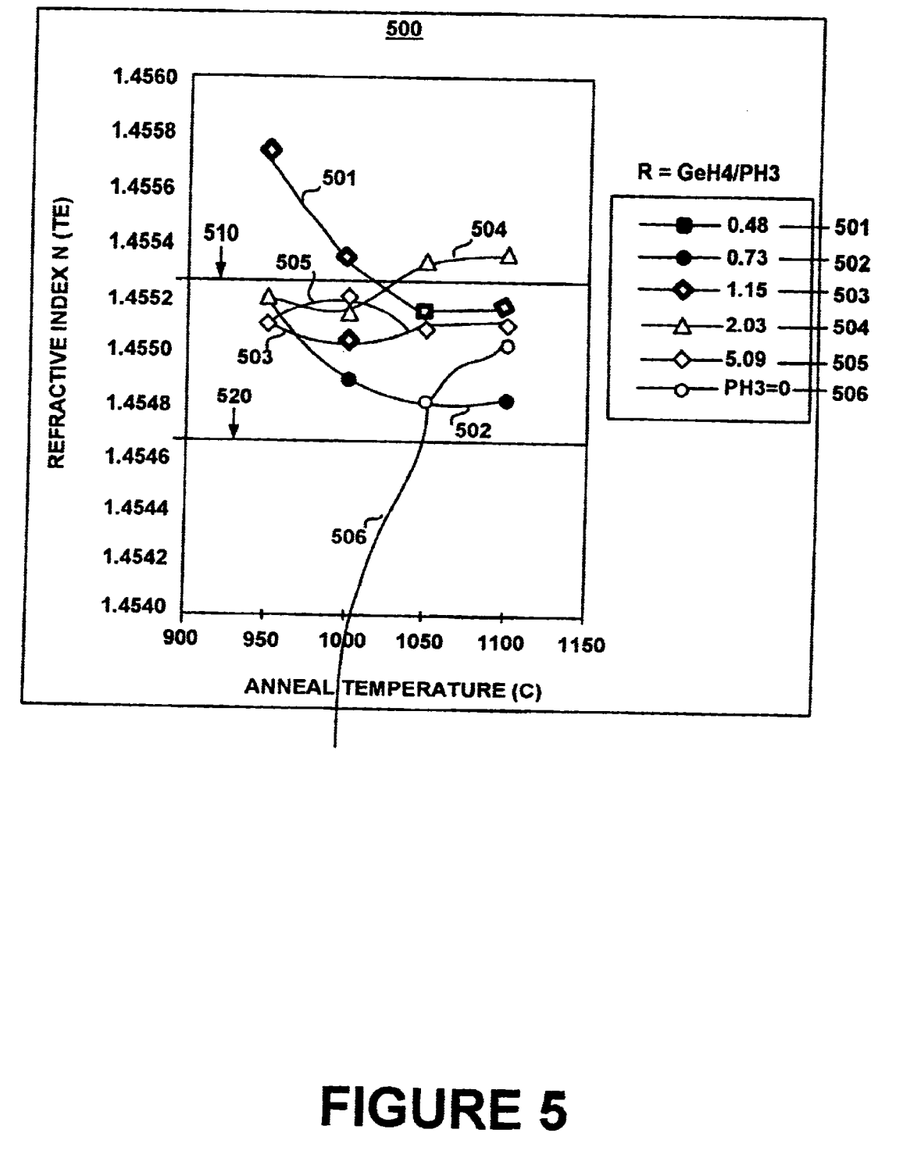
FIG. 5 shows a graph of experimental test results depicting the refractive index of the TE propagation mode for different ratios of $GeH_4$ and $PH_3$ in accordance with one embodiment of the present invention.

FIG. 5 shows a graph 500 of experimental test results depicting the refractive index of the TE propagation mode for different ratios of $GeH_4$ and $PH_3$. As shown in graph 500, six traces 501–506 are shown for six different ratios of $GeH_4$ and $PH_3$, the ratios being listed in the legend on the right hand side of graph 500. The vertical axis of graph 500 shows the refractive index for the TE propagation mode measured at approximately 1550 nm wavelength. The specified upper and lower limits of the allowable range for the refractive index are shown by lines 510 and 520. The anneal temperature range is shown across the horizontal axis, ranging from 950 C. to 1100 C. As used herein, the ratio is equal to $GeH_4/PH_3$.

As shown in FIG. 5, ratios 502, 505, and 503 show the greatest amount of refractive index anneal temperature stability. In contrast, ratio 501 ($P_2O_5$ rich GePSG) shows the greatest amount of refractive index decrease with increasing anneal temperature, and 506 (pure Ge doped $SiO_2$) shows the greatest amount of refractive index increase with increasing anneal temperature, with both traces having a significant out-of-specification condition across the anneal temperature range.

Figure 6:
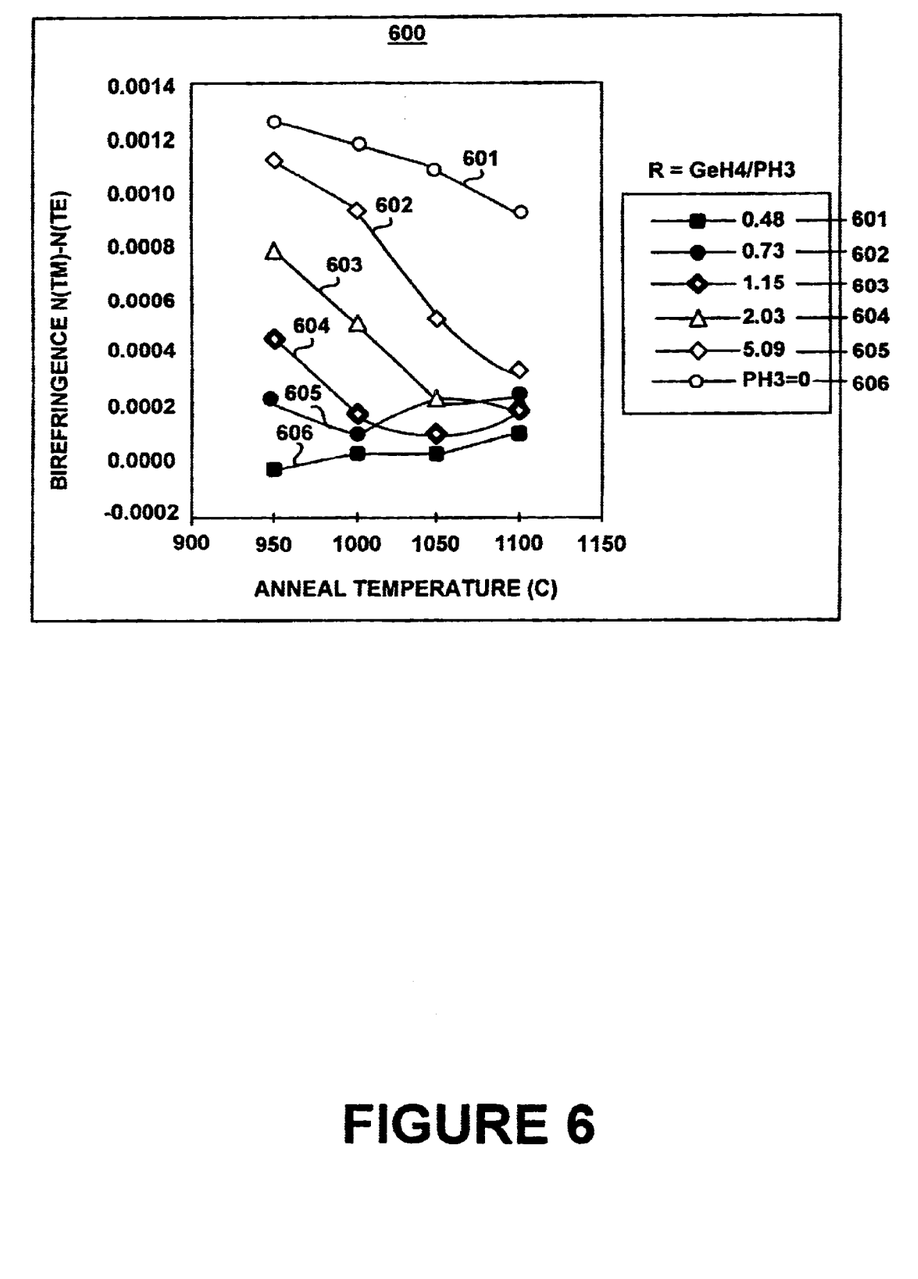
FIG. 6 shows a graph of experimental test results depicting the birefringence (e.g., TM mode of refractive index minus TE mode of refractive index) for different ratios of $GeH_4$ and $PH_3$ in accordance with one embodiment of the present invention.

FIG. 6 shows a graph 600 of experimental test results depicting the birefringence (e.g., TM mode refractive index minus TE mode refractive index) for different ratios of $GeH_4$ and $PH_3$. As shown in graph 600, six traces are shown for six different ratios 601–606 of $GeH_4$ and $PH_3$, the ratios being listed in the legend on the right hand side. The vertical axis of graph 600 shows the birefringence measured at approximately 1550 nm wavelength. The anneal temperature range is shown across the horizontal axis, ranging from 950 C. to 1100 C. As shown in FIG. 6, birefringence is almost constant within the anneal temperature region from 1000 to 1100 as shown by ratios 604, 605, and 606, and can be controlled to a substantially zero value, as shown by ratio 606.

Figure 7:
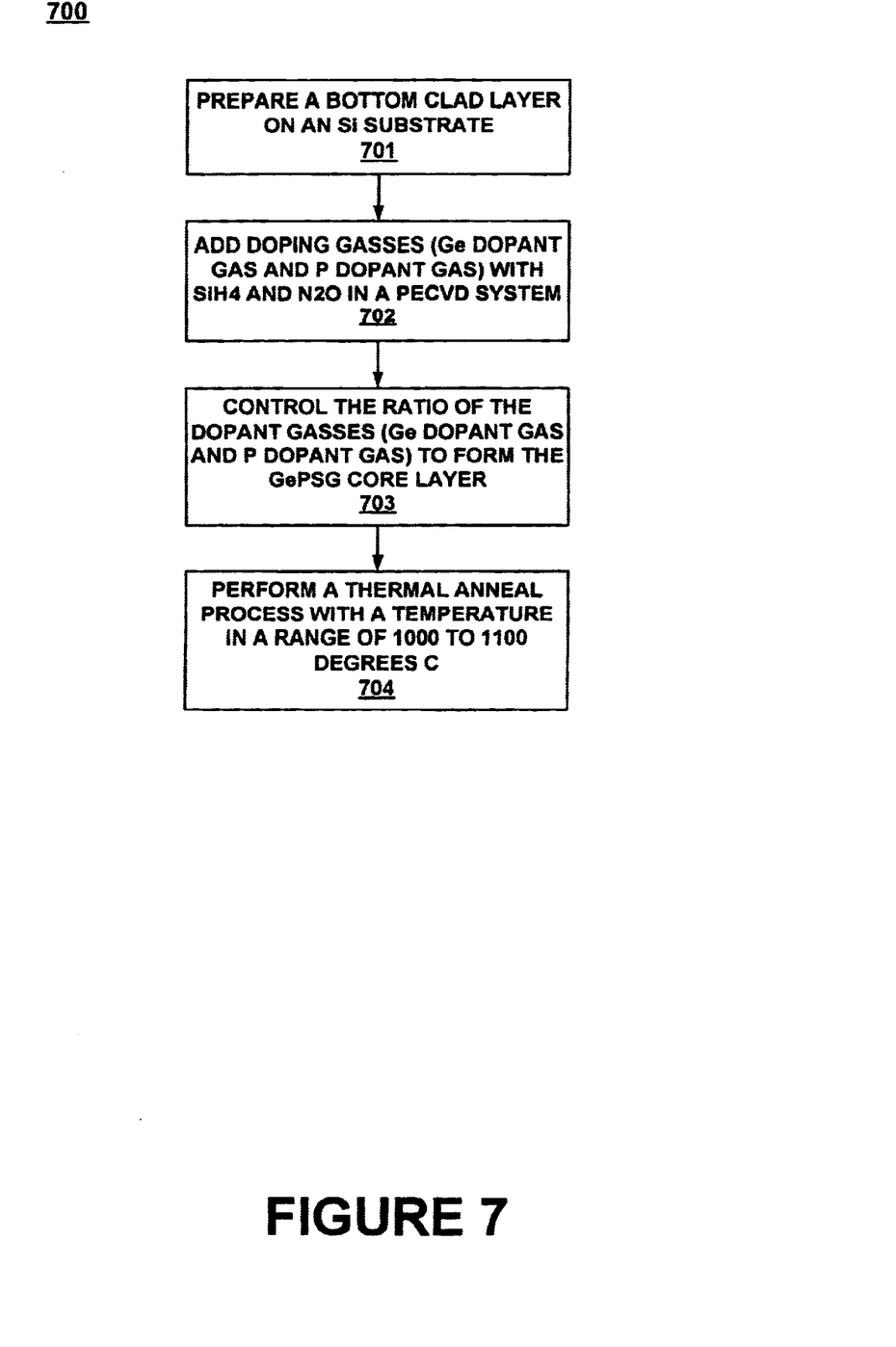
FIG. 7 shows a flowchart of the steps of a GePSG core layer deposition process in accordance with one embodiment of the present invention.

Referring now to FIG. 7, a flowchart of the steps of a process 700 in accordance with one embodiment of the present invention is shown. Process 700 depicts the process steps involved in depositing a GePSG doped core layer in accordance with the present invention.

Process 700 begins in step 701, where a bottom clad layer is prepared on an Si substrate. In step 702, doping gasses (e.g., Ge dopant and P dopant) are added with $SiH_4$ and $N_2O$ in a PECVD system. In step 703, the ratio of the Ge dopant gas and the P dopant gas are controlled to form the GePSG core layer having precisely controlled ratios of Ge dopant and P dopant. In step 704, a thermal anneal process is performed with a temperature in a range of 900 C. to 1200 C. As described above, the anneal process can be a multi-step anneal process, since GePSG has greater temperature stability than the prior art.

Figure 8:
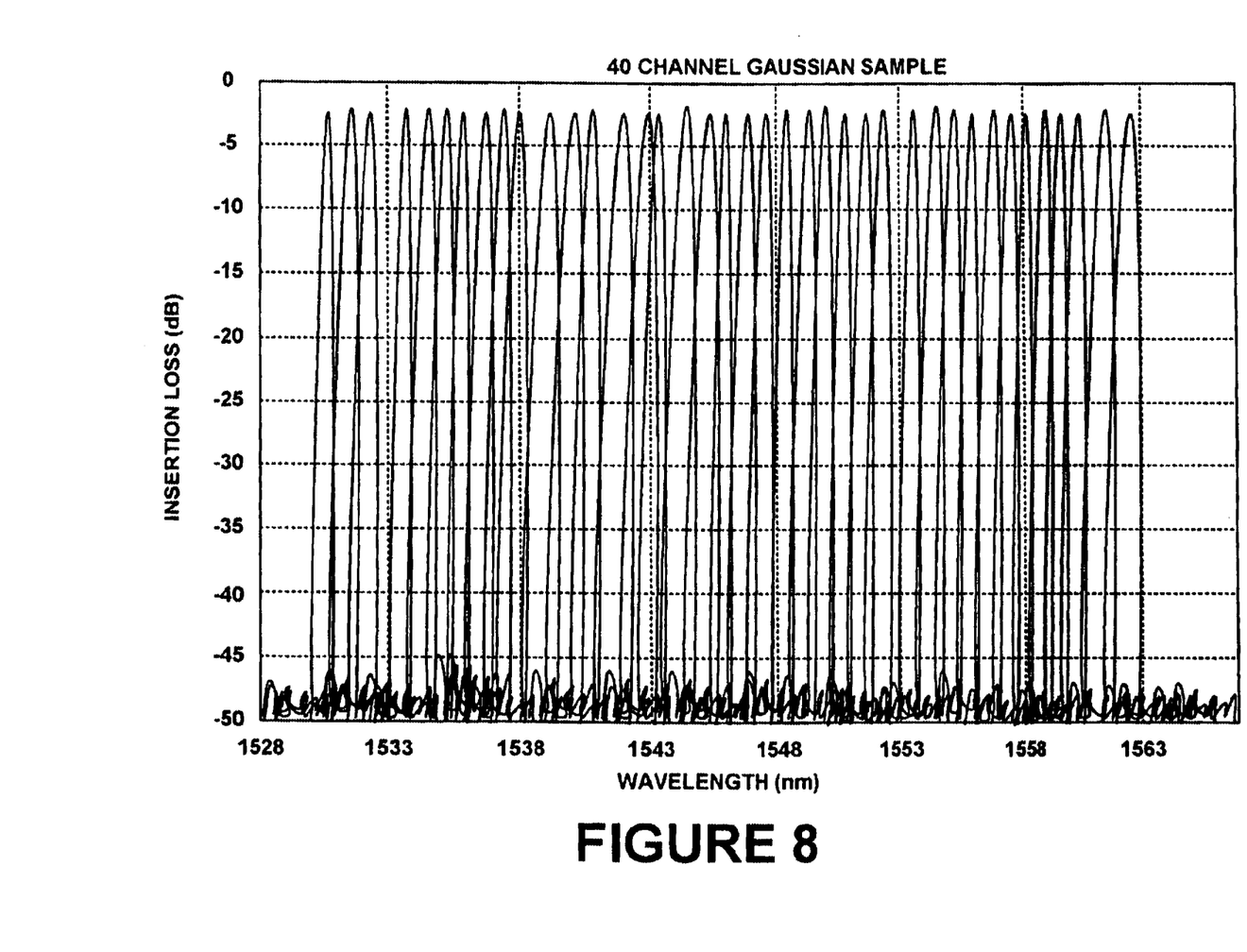
FIG. 8 shows a diagram of the spectral output of a high-performance AWG planar lightwave circuit fabricated with a method in accordance with the present invention.

FIG. 8 shows a diagram 800 of the spectral output of a high-performance AWG planar lightwave circuit having been fabricated with a method in accordance with the present invention. As depicted in FIG. 8, a 40 channel Gaussian sample of the output of an AWG device is graphed with respect to insertion loss on the vertical axis, and channel wavelength, on the horizontal axis. It should be noted that less than 0.8 nm wavelength separates the peaks of each channel. It should also be noted that the peaks of each channel are substantially constant in amplitude, from the lowest channel to the highest channel. Reliable performance of high-performance optical communications equipment is critically dependent upon equal channel spacing and equal channel amplitude to maintain high data rates (e.g., 10 Gbps or greater). The GePSG core layer deposition process of the present invention removes many of the problems prevalent in the prior art, with respect to refractive index birefringence, bubble formation, waveguide core profile control, and refractive index anneal temperature stability, thereby increasing device reliability and device performance.

Thus, the present invention provides a predictable and stable refractive index for optical waveguide cores within a planar lightwave circuit. A GePSG core for an optical waveguide structure in accordance with the present invention provides a solution for refractive index accuracy to 0.0003 within wafer. The present invention eliminates the formation of bubbles and reduces other types of flaws within a core layer.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, thereby to enable others skilled in the art to best utilize the invention and various embodiments with various modifications as are suited to the particular use contemplated. It is intended that the scope of the invention be defined by the claims appended hereto and their equivalents.

What is claimed is:

1. A method of depositing a core layer for an optical waveguide structure of a planar lightwave circuit, the method comprising the steps of:
    a) providing a flow rate for a Ge dopant for a $SiO_2$ core layer deposition;
    b) providing a flow rate for a P dopant for the core layer deposition; and
    c) controlling the flow rate for the Ge dopant and the flow rate for the P dopant to form the core layer, thereby increasing refractive index stability of the core layer across an anneal temperature range, and wherein the controlling of the flow rate for the Ge dopant and the flow rate for the P dopant is configured to reduce a formation of bubbles within the core layer.

2. The method of claim 1, wherein the controlling of the flow rate for the Ge dopant and the flow rate for the P dopant is configured to increase refractive index stability of the core layer across an anneal temperature range from 900 C. to 1200 C.

3. The method of claim 1, wherein the controlling of the flow rate for the Ge dopant and the flow rate for the P dopant is configured to reduce birefringence within the core layer across an anneal temperature range for the core layer.

4. The method of claim 1, wherein the Ge dopant comprises $GeH_4$, $Ge_2H_6$ or $Ge(C_2H_5O)_4$.

5. The method of claim 1, wherein the P dopant comprises $PH_3$ or tetramethyl phosphine (TMP).

6. The method of claim 1, further including the step of using a thermal anneal process with a temperature in a range of 900 C. to 1200 C. after the core layer deposition of step c).

7. A method of depositing a core layer having a reduced birefringence for an arrayed waveguide grating device, the method comprising the steps of:
    a) providing a flow rate for a Ge dopant for an $SiO_2$ core layer deposition;
    b) providing a flow rate for a P dopant for the core layer deposition; and
    c) controlling the flow rate for the Ge dopant arid the flow rate for the P dopant to form the core layer, thereby reducing birefringence within the core layer, wherein the controlling of the flow rate for the Ge dopant and the flow rate for the P dopant is configured to reduce a formation of bubbles within the core layer during an anneal process.

8. The method of claim 7, wherein the Ge dopant comprises $GeO_2$.

9. The method of claim 7 wherein the controlling of the flow rate for the Ge dopant and the flow rate for the P dopant is configured to reduce a center wavelength shift of the arrayed waveguide grating device.

10. The method of claim 7, further including the step of using a thermal anneal process with a temperature in a range of 900 C. to 1200 C. after the core layer deposition of step c).

11. The method of claim 7, wherein the controlling of the flow rate for the Ge dopant and the flow rate for the P dopant is configured to reduce birefringence within the core layer by tuning a CTE within the core layer.

12. The method of claim 7, wherein the controlling of the flow rate for the Ge dopant and the flow rate for the P dopant is configured to control the width of the waveguide core.

13. A method of depositing a core layer for an optical waveguide structure of a planar lightwave circuit, the method comprising:

flowing a Ge dopant for a $SiO_2$ core layer deposition;

flowing a P dopant for the core layer deposition; and controlling a flow rate for the Ge dopant and a flow rate for the P dopant to form the core layer, wherein the controlling of the flow rate for the Ge dopant and the flow rate for the P dopant is configured to reduce a formation of bubbles within the core layer.

14. The method of claim 13, wherein the controlling of the flow rate for the Ge dopant and the flow rate for the P dopant is configured to increase refractive index stability of the core layer across an anneal temperature range from 900 C. to 1200 C.

15. The method of claim 13, wherein the controlling of the flow rate for the Ge dopant and the flow rate for the P dopant is configured to reduce birefringence within the core layer across an anneal temperature range for the core layer.

16. The method of claim 13, wherein the Ge dopant comprises $GeH_4$, $Ge_2H_6$ or $Ge(C_2H_5O)_4$.

17. The method of claim 13, wherein the P dopant comprises $PH_3$ or tetramethyl phosphine (TMP).

* * * * *